United States Patent
Min et al.

(10) Patent No.: US 7,988,281 B2
(45) Date of Patent: Aug. 2, 2011

(54) STRUCTURAL MEMBER FOR EYEGLASS, EYEGLASS FRAME COMPRISING THE STRUCTURAL MEMBER, AND PROCESSES FOR PRODUCTION OF THE STRUCTURAL MEMBER AND THE EYEGLASS FRAME

(75) Inventors: Wang Xin Min, Sendai (JP); Hiroyuki Tada, Sabae (JP)

(73) Assignees: Charmant Co., Ltd., Sabae-shi Fukui (JP); Japan Basic Material Col., Ltd., Sendai-shi Miyagi (JP)

( * ) Notice: Subject to any disclaimer, the term of this patent is extended or adjusted under 35 U.S.C. 154(b) by 345 days.

(21) Appl. No.: 11/921,725

(22) PCT Filed: Jun. 12, 2006

(86) PCT No.: PCT/JP2006/311711
§ 371 (c)(1),
(2), (4) Date: Dec. 5, 2007

(87) PCT Pub. No.: WO2006/132409
PCT Pub. Date: Dec. 14, 2006

(65) Prior Publication Data
US 2010/0073624 A1 Mar. 25, 2010

(30) Foreign Application Priority Data
Jun. 10, 2005 (JP) .................................. 2005-170439

(51) Int. Cl.
*G02C 1/00* (2006.01)
*C22C 14/00* (2006.01)

(52) U.S. Cl. ............ 351/41; 351/111; 351/124; 148/421
(58) Field of Classification Search .................... 351/41, 351/158, 111, 124; 148/421; 420/417, 422; 623/23.7, 23.71, 900
See application file for complete search history.

(56) References Cited

U.S. PATENT DOCUMENTS
6,238,491 B1  5/2001 Davidson et al.
(Continued)

FOREIGN PATENT DOCUMENTS
CN  1461816  12/2003
(Continued)

OTHER PUBLICATIONS
European Patent Office Search Report dated Sep. 6, 2010 (11 pages).

*Primary Examiner* — Hung X Dang
(74) *Attorney, Agent, or Firm* — Flynn, Thiel, Boutell & Tanis, P.C.

(57) ABSTRACT

Disclosed are: a structural member for use in an eyeglass which has a super elastic property and shape memory property while retaining an excellent biocompatibility in addition to the fact that it is N-free, and which also has an excellent cold workability; an eyeglass frame containing the structural member; and a process for producing the structural member or eyeglass frame. A structural member for an eyeglass containing a Ti—Nb—Zr alloy which comprises (A) 40 to 75% by weight of Ti, (B) 18 to 30% by weight of Nb, (C) 10 to 30% by weight of Zr and (D) 0.2 to 3.7% by weight of at least one additive metal element selected from the group consisting of Al, In and Ga.

7 Claims, 16 Drawing Sheets

Ti-22Zr-22Nb-1.1Al
Super elastic property: after solution heat treatment (800°C) → aging treatment (200°C)

U.S. PATENT DOCUMENTS

| | | | |
|---|---|---|---|
| 6,767,418 B1 * | 7/2004 | Zhang et al. | 148/421 |
| 6,786,984 B1 | 9/2004 | Hanada et al. | |
| 2002/0033717 A1 | 3/2002 | Matsuo | |
| 2005/0231684 A1 * | 10/2005 | Tokumaru | 351/178 |

FOREIGN PATENT DOCUMENTS

| | | |
|---|---|---|
| CN | 1461816 A | 12/2003 |
| CN | 1693504 A | 11/2005 |
| DE | 199 35 935 A1 | 2/2000 |
| EP | 1 162 282 A2 | 12/2001 |
| JP | 3023730 | 2/1996 |
| JP | 2000-273597 | 10/2000 |
| JP | 2001247924 | 9/2001 |
| JP | 2002327225 | 11/2002 |
| JP | 2005-301167 | 10/2005 |
| WO | WO 9534251 A1 | 12/1995 |
| WO | WO 00/68448 | 11/2000 |
| WO | WO 2004/042096 A1 | 5/2004 |
| WO | WO 2004/042097 A1 | 5/2004 |
| WO | WO 2005/005677 A1 | 1/2005 |

* cited by examiner

Ti-22Zr-23Nb-1.6Al
Solution treatment at 800°C

Ti-22Zr-23Nb-1.9Al
Solution treatment at 800°C

Ti-22Zr-23Nb-2.3Al
Solution treatment at 800°C

Ti-22Zr-23Nb-1.3Al
Solution treatment at 800°C

Ti-22Zr-23Nb-1.3Al
Solution treatment at 800°C

Ti-22Zr-23Nb-3.0Sn
Solution treatment at 800°C

Ti-22Zr-23Nb-3.5In
Solution treatment at 800°C

Ti-22Zr-23Nb-1.3Ga
Solution treatment at 800°C

Ti-22Zr-22Nb-1.1Al

Shape memory property: after solution heat treatment (800°C)

Ti-22Zr-22Nb-1.1Al

Super elastic property: after solution heat treatment (800°C) → aging treatment (200°C)

Ti-22Zr-22Nb-1.1Al

Solution treatment→ aging treatment→ coating→ baking

Ti-22Zr-22Nb-1.1Al
Solution treatment→ coating→ aging treatment (baking)

Ti-22Zr-23Nb-1.3Al
Solution treatment at 500°C

Ti-22Zr-22Nb-1.1Al

Solution treatment→ first aging treatment (broken line) → second aging treatment (solid line)

Ti25Nb5Zr2.5Al

STRUCTURAL MEMBER FOR EYEGLASS, EYEGLASS FRAME COMPRISING THE STRUCTURAL MEMBER, AND PROCESSES FOR PRODUCTION OF THE STRUCTURAL MEMBER AND THE EYEGLASS FRAME

TECHNICAL FIELD

The present invention relates to a structural member for use in an eyeglass using a shape memory and a super elastic alloy with an excellent cold workability and biocompatibility as well, and an eyeglass frame comprising the same, and processes for production thereof.

More specifically, the invention relates to a structural member for use in an eyeglass, comprising a shape memory and a super elastic alloy which has a super elastic property and a shape memory property in addition to the fact that it is Ni-free and has an excellent biocompatibility, also has an excellent cold workability, and an eyeglass frame comprising the structural member, and processes for producing them.

BACKGROUND ART

As a typical alloy having a shape memory property and a super elastic property, conventionally, a Ti—Ni alloy has been known (for example, see Patent Document 1).

Herein, a shape memory means a phenomenon that a residual strain is eliminated in the case where a metal is heated.

Further, the residual strain means a strain that when a metal with a certain shape firstly given (for example, coil shape) is loaded to stretch beyond its elastic limit leading to a plastic deformation, thereafter, occurs in the metal on unloading.

Additionally, the shape memory is a phenomenon utilizing martensitic transformation-reverse martensitic transformation, for example, it is utilized in a turbine-type heat engine, pipe connection, wire for brassieres and the like.

On the other hand, the superelasticity is referred to a phenomenon that when a metal is loaded in the same manner as described above to stretch beyond its elastic limit leading to a plastic deformation, on unloading from this state, it comes back to the original state (residual strain is almost zero state) while drawing a hysteresis.

The superelasticity generates without increasing a temperature in martensitic transformation-reverse martensitic transformation, so that it is basically the same phenomenon as the shape memory.

In other words, for a metal with a shape memory property, a residual strain is eliminated by heating, whereas for a metal with a super elastic property, a residual strain is eliminated without heating.

A Ti—Ni alloy has a shape memory property and super elastic property in addition to a so-called intermetallic compound composed of at least 2 kinds of metals, and it can be formed in a shape of a plate or line by plastic working.

Further, the martensitic transformation-reverse martensitic transformation of a Ti—Ni alloy is generated at both ends in a specific temperature range near room temperature.

Hence, the Ti—Ni alloy exhibits a shape memory property and a super elastic property in this temperature range.

However, since the Ti—Ni alloy contains a Ni component, it has poor biocompatibility.

Herein, biocompatibility means a degree of metal allergy when skin touches a metal.

Additionally, an excellent biocompatibility means that skin hardly shows a metal allergy.

Therefore, it is difficult to utilize a Ti—Ni alloy as a structural member for an eyeglass contacting facial skin.

Further, as another problem, because a Ti—Ni alloy exhibits the martensitic transformation-reverse martensitic transformation near room temperature, it drastically becomes soft at −5° C. or less.

Namely, a Ti—Ni alloy has a poor low-temperature property.

In this situation, there has been attempted a development of a shape memory and super elastic alloy which has a high-temperature property without containing Ni, which is highly toxic to the human body (see Non-patent Document 1).
Patent Document 1: Japanese Unexamined Patent Publication No. 2002-205164
Non-patent Document 1: "Development of Ti—Sc—Mo shape memory alloy", The Japan Institute of Metals, lecture abstract p. 144 at springtime meeting, 2003.

DISCLOSURE OF THE INVENTION

Problems to be Solved by the Invention

However, conventional Ni-free alloys show only a little super elastic property or shape memory property, and it is difficult to utilize a Ni-free alloy as a structural member for an eyeglass.

Further, conventional Ni-free alloys have a drawback that they are poor in cold workability and difficult to be processed into a plate material which is thin and curved such as a structural member for an eyeglass.

The present invention was made in the view of the background arts and achieved in order to solve the problems of the background arts described above.

Namely, the present invention aims to provide a structural member for use in an eyeglass, having a super elastic property and a shape memory property in addition to the fact that it is Ni-free and has an excellent biocompatibility, also having an excellent cold workability, and an eyeglass frame comprising the structural member, and processes for producing them.

Means to Solve the Problem

In this way, the present inventors have keenly studied the background of such problems and, as a result, have found that the above-described problems can be solved by using a Ti—Nb—Zr alloy of a certain composition, and completed the present invention based on this finding.

Namely, the present invention is (1) a structural member for an eyeglass comprising a Ti—Nb—Zr alloy whose alloy composition is: (A) Ti: 40 to 75% by weight; (B) Nb: 18 to 30% by weight; (C) Zr: 10 to 30% by weight; and (D) at least one additive metal element selected from the group consisting of Al, Sn, In and Ga: 0.2 to 3.7% by weight.

Further, the present invention is (2) the structural member for an eyeglass of the above-described (1), obtained by conducting a solution treatment at 550° C. to 1100° C.

Further, the present invention is (3) the structural member for an eyeglass of the above-described (2), obtained by conducting an aging treatment at 100° C. or more after the solution treatment.

Further, the present invention is (4) the structural member for an eyeglass of the above-described (2), wherein the solution treatment is conducted, and after plating or coating is conducted on a surface, the plating or coating is baked at the same time by conducting an aging treatment at 100° C. or more.

Further, the present invention is (5) the structural member for an eyeglass of the above-described (1), which is a rim, a bridge, a bracket, a nose pad support or a temple.

Further, the present invention is (6) an eyeglass frame comprising the above-described structural member for an eyeglass.

Further, the present invention is (7) a process for production of a structural member for an eyeglass, comprising: cold working a Ti—Nb—Zr alloy whose alloy composition is: (A) Ti: 40 to 75% by weight; (B) Nb: 18 to 30% by weight; (C) Zr: 10 to 30% by weight; and (D) at least one additive metal element selected from the group consisting of Al, Sn, In and Ga: 0.2 to 3.7% by weight in a surface reduction ratio of 50% or more to lengthen into a final shape; and then, conducting a solution treatment to provide a shape memory property and a super elastic property.

Further, the present invention is (8) the process for production of a structural member for an eyeglass of the above-described (7), wherein the temperature of the solution treatment is 550° C. to 1100° C.

Further, the present invention is (9) the process for production of a structural member for an eyeglass in above-described (7), wherein an aging treatment is conducted at 100° C. or more after the solution treatment.

Further, the present invention is (10) the process for production of a structural member for an eyeglass of the above-described (7), wherein the solution treatment is conducted, and after plating or coating is conducted on a surface, baking of the plating or coating is conducted at the same time by conducting an aging treatment at 100° C. or more.

Further, the present invention is (11) the process for production of a structural member for an eyeglass of the above-described (9), wherein the aging treatment is plurally conducted to heighten an apparent yield stress of a superelasticity.

Further, the present invention is (12) the process for production of a structural member for an eyeglass of the above-described (7), wherein the structural member for an eyeglass is a rim, a bridge, a bracket, a nose pad support or a temple.

Further, the present invention is (13) a process for production of an eyeglass frame comprising the structural member for an eyeglass obtained by the above-described process for production.

Additionally, a constitution suitably combined with the above-described (1) though (13) can be adopted as long as it suits to the object of the present invention.

Effect of the Invention

The alloy of the structural member for an eyeglass in the present invention forms a strong and fine oxide layer and is composed of Ti, Nb and Zr with an excellent biocompatibility.

Namely, a Ti—Nb—Zr alloy is used for the structural member for an eyeglass of the present invention.

The above-described Ti—Nb—Zr alloy functions as a shape memory alloy, and it is suitable for a material of an eyeglass which directly contacts a face skin.

The Ti—Nb—Zr alloy used for the structural member for an eyeglass of the present invention is excellent in cold workability, and it can stand a rolling working up to a surface reduction ratio of 50% or more.

Further, the Ti—Nb—Zr alloy used for the structural member for an eyeglass of the present invention can be processed up to a surface reduction ratio of 95% or more without annealing treatment through processing by separating in a plurality of steps.

In the Ti—Nb—Zr alloy used for the structural member for an eyeglass of the present invention, the martensitic transformation-reverse martensitic transformation takes place in a range of −50° C. to −30° C.

Therefore, rigidity of the Ti—Nb—Zr alloy used for the structural member for an eyeglass of the present invention is not lowered drastically at a temperature near 0° C., thus it has an excellent low-temperature property within a temperature range of actual use.

Further, since the eyeglass frame of the present invention comprises the above-described structural member for an eyeglass, the above-mentioned effects can be exhibited.

BEST MODE FOR CARRYING OUT THE INVENTION

The Ti—Nb—Zr alloy of the structural member for an eyeglass of the present invention has Ti, Nb and Zr as major components, the specific alloy composition is: (A) Ti: 40 to 75% by weight; (B) Nb: 18 to 30% by weight; (C) Zr: 10 to 30% by weight; and (D) at least one additive metal element selected from the group consisting of Al, Sn, In and Ga: 0.2 to 3.7% by weight.

Additionally, the added amount of the additive metal element is 0.2 to 3.7% by weight in total even when additive elements may be plural.

Hereinafter, components (A) to ('D) are described further in detail.

(A) Component (A) component is Ti contained in the Ti—Nb—Zr alloy of the structural member for an eyeglass of the present invention.

Crystal structure of the Ti is preferably a body-centered cubic structure.

In this case, since Ti has a large ductility, the Ti—Nb—Zr alloy becomes better in superelasticity.

Further, although Ti is a hexagonal close packed structure (α phase) at normal temperature, it can be converted into a body-centered cubic structure (β phase) by heating at 882° C. or more.

Additionally, after being converted into a body-centered cubic structure, the body-centered cubic structure is maintained, even when cooled.

Generally, Ti is readily oxidized into TiO2 in contacting oxygen in air.

Besides, pure Ti (grade 2, JIS H2151) has a Young's modulus of 106 GPa, when it is heated at 610° C. or more, a fine oxide layer of TiO2 is formed on the surface.

This oxide layer of TiO2 does not chemically change in air at normal temperature, and is excellent in strength and corrosion resistance.

The above-described Ti and pure Ti are excellent in specific strength (a value that tensile strength is divided by specific gravity), thus they are often used as a base of an alloy.

A Ti—Nb—Zr alloy with Ti as a base becomes a solid solution when alloyed, and there are instances that the ductility of the alloy is lowered.

In this case, forging, which is a plastic working for improving the cast structure of a Ti—Nb—Zr alloy, cannot be conducted, thus the Ti—Nb—Zr alloy used has preferably a high plastic workability.

The content rate of Ti contained in a Ti—Nb—Zr alloy is 40 to 75% by weight.

When the content is less than 40% by weight, there is a tendency not to sufficiently obtain an excellent strength, specific strength, corrosion resistance and stability, which are merits of Ti, whereas when it is more than 75% by weight, there is a tendency for a Ti—Nb—Zr alloy to markedly exhibit poor workability, which is an inherent weak point of Ti, and not to be workable at normal temperature.

(B) Component (B) component is Zr contained in the Ti—Nb—Zr alloy of the structural member for an eyeglass of the present invention.

The crystal structure of the Zr is preferably a body-centered cubic structure.

Further, although Zr is a hexagonal close packed structure (α phase) at normal temperature, it can be converted into a body-centered cubic structure (β phase) by heating at 862° C. or more.

Additionally, after being converted into a body-centered cubic structure, the body-centered cubic structure is maintained, even when cooled.

In the case where Zr is exposed to air, a fine oxide layer is formed on the surface of Zr.

In this case, Zr is excellent in corrosion resistance.

Further, the corrosion resistance of Zr in water of a high temperature is remarkably high as compared with other metals.

Further, Zr hardly reacts, even in a melt alkali, through the formation of oxide layer.

Namely, Zr is excellent in corrosion resistance.

Zr with an excellent corrosion resistance and acid resistance is used as an alloy component of a member required for biocompatibility or in various machines.

The content rate of Zr in a Ti—Nb—Zr alloy of the structural member for an eyeglass of the present invention is in a range of 10 to 30% by weight based on the constituent elements. When the content rate of Zr is less than 10% by weight, the workability of a Ti—Nb—Zr alloy is lowered.

Further, when the content of Zr is more than 30% by weight, the corrosion resistance of a Ti—Nb—Zr alloy is not improved and, only results in an increase in the specific gravity.

The Ti—Nb—Zr alloy of the structural member for an eyeglass of the present invention will have both the excellent strength and excellent corrosion resistance that are characteristic of Ti or Zr by adjusting the content rate of Zr in a specific range.

As a result, the structural member for an eyeglass of the present invention exhibits a good corrosion resistance and acid resistance.

(C) Component

The (C) component is Nb contained in the Ti—Nb—Zr alloy of the structural member for an eyeglass of the present invention.

Nb exhibits a good ductility, its Young's modulus is 105 GPa, and its strength is the same level as wrought iron.

Further, generally, when Nb is added to an alloy, the alloy is provided with a pliableness (low elasticity).

When Nb contacts with air, an oxide layer is formed on its surface.

Hence, Nb shows a good corrosion resistance.

Therefore, by applying Nb as a constituent in a Ti—Nb—Zr alloy used in the structural member for an eyeglass of the present invention, the corrosion resistance and acid resistance of the Ti—Nb—Zr alloy can be improved in cooperation with Zr.

The content rate of Nb in a Ti—Nb—Zr alloy of the structural member for an eyeglass of the present invention is 18 to 30% by weight.

When the content rate of Nb is less than 18% by weight, the resulting alloy is not sufficiently provided with pliableness.

On the other hand, the Young's modulus of the above-described Ti—Nb—Zr alloy is increased, causing a problem of the lowering of plastic workability.

Further, when the content of Nb is more than 30% by weight, neither pliableness nor corrosion resistance of the resulting alloy is enhanced.

Further, the biocompatibility of the above-described Ti—Nb—Zr alloy to body tissue is not improved, only its specific gravity is increased.

(D) Component (D) component is at least one additive metal element selected from the group consisting of Al, Sn, In and Ga contained in a Ti—Nb—Zr alloy of the structural member for an eyeglass of the present invention.

In the case where the content of this additive metal element is 0.2 to 3.7% by weight, the resulting alloy exhibits a shape memory property and a super elastic property.

When the content rate of the additive metal element is less than 0.2% by weight, the resulting Ti—Nb—Zr alloy becomes too soft, thus, it cannot be used for biomaterials or parts of machinery and equipment.

Further, when the total content rate of the additive metal elements exceeds 3.7% by weight, the resulting Ti—Nb—Zr alloy does not exhibit a shape memory property and a super elastic property (see Table 3), and workability of the resulting alloy becomes poor.

Next, the process for production of a structural member for an eyeglass according to the present invention will be explained.

The process for production of the structural member for an eyeglass of the present invention is to conduct cold working of the above-mentioned Ti—Nb—Zr alloy by applying a physical pressure thereto and conduct a solution treatment by heating.

Namely, specifically, first, a cold working of a Ti—Nb—Zr alloy whose composition is: (A) Ti: 40 to 75% by weight; (B) Nb: 18 to 30% by weight; (C) Zr: 10 to 30% by weight; and (D) at least one additive metal element selected from the group consisting of Al, Sn, In and Ga: 0.2 to 3.7% by weight in a surface reduction ratio of 50% or more to lengthen the alloy and make it thin.

Then, the thinned Ti—Nb—Zr alloy is formed into a shape of a structural member for an eyeglass according to the application.

Herein, the structural member for an eyeglass includes a rim, a bridge, a bracket, a nose pad support or a temple.

Herein, "cold working" means a plastic working of a metal or alloy conducted at a temperature range generating strain hardening.

Further, "surface reduction ratio" means a ratio of cross-sectional change before and after press working.

Additionally, in the case of a Ti—Nb—Zr alloy whose cross section is rectangular, the above-described "surface reduction ratio" can also be expressed by "rolling ratio" or "reduction ratio."

Additionally, to form a structural member for an eyeglass with a surface reduction ratio of 50% or more, it is important to consider a ratio of the volume of a structural member for an eyeglass finally formed to the volume of a Ti—Nb—Zr alloy of a starting material.

The Ti—Nb—Zr alloy formed in a structural member for an eyeglass is then heated at 550° C. to 1100° C., thereby producing a structural member for an eyeglass provided with a shape memory property and a super elastic property.

By heating a Ti—Nb—Zr alloy in the above-described temperature range, a suitable shape memory property and super elastic property can be given to the Ti—Nb—Zr alloy while keeping a shape with a surface reduction ratio of 500 or more.

Further, a balance of the degrees of a shape memory property and a super elastic property to be provided can be suitably adjusted by heating temperature and heating time.

When a Ti—Nb—Zr alloy is heated at 550° C. or more, the Ti—Nb—Zr alloy exhibits a shape memory property and a super elastic property more strongly compared with the case when it is heated at less than 550° C.

Further, when a Ti—Nb—Zr alloy is heated at 1100° C. or less, the Ti—Nb—Zr alloy has better shape stability compared with the case heated at a temperature exceeding 1100° C., which is suitable for the structural member for an eyeglass of the present invention.

To improve the alloy's functions as a structural member for an eyeglass contacting a face, it is preferable to conduct a solution treatment to the Ti—Nb—Zr alloy provided with a shape memory property and a super elastic property, and after conducting the solution treatment, it is more preferable to conduct an aging treatment thereto.

Herein, the solution treatment is a heat treatment where a carbide or the like is rapidly cooled from a state of a solid solution at a high temperature to bring the high temperature structure as it is to a normal temperature.

Further, the aging treatment is a treatment changing the quality of an alloy with time, specifically, heating the above-described Ti—Nb—Zr alloy at 100° C. or more.

By conducting the aging treatment, the above-described Ti—Nb—Zr alloy has a high apparent yield stress of a super elastic property compared to the case with no aging treatment.

Herein, the apparent yield stress is a stress of becoming a boundary between the cases of elastic deformation and plastic deformation of a Ti—Nb—Zr alloy, for example, when a predetermined stress is loaded on a Ti—Nb—Zr alloy.

By increasing the number of aging treatments, the above-described Ti—Nb—Zr alloy can heighten the apparent yield stress of a superelasticity according to the kinds of structural members for an eyeglass.

Further, baking treatment of plating or coating can be conducted at the same time by conducting the aging treatment.

Hence, by conducting an aging treatment to the above-described Ti—Nb—Zr alloy, a baking treatment is not required at all after the coating or plating, which can reduce production man-hours.

Additionally, it becomes possible to give decorations such as coloring and patterning to a structural member for an eyeglass by the above-described coating or plating.

The Ti—Nb—Zr alloy processed by a solution treatment, coating (plating) and aging treatment in this order has a higher apparent yield stress than a Ti—Nb—Zr alloy processed by a solution treatment, aging treatment, coating (plating) and baking in this order, thus, in bending the structural member for an eyeglass of the present invention, the case where a plating is conducted before conducting an aging treatment yields a hardness compared with the case where a plating is conducted after conducting an aging treatment.

In this way, the structural member for an eyeglass of the present invention is obtained. FIG. 16 is a figure showing a schematic diagram of a structural member for an eyeglass.

As shown in FIG. 16, the structural member for an eyeglass of the present invention is used as, for example, a rim, a bridge, a bracket (also called joint), a nose pad support, a temple or other part for an eyeglass.

EXAMPLES

Embodiments of the present invention have been described so far, next, the present invention is explained with reference to Examples.

Examples 1 to 15 and Comparative Examples 1 to 34

A Ti—Nb—Zr alloy was produced by setting Al: 1.3% by weight, Nb and Zr of the contents shown in the following Table 1, and Ti as a value that the contents of Nb, Zr and Al were subtracted from 100.

For this Ti—Nb—Zr alloy, cold working was conducted at room temperature for a surface reduction ratio to be 70%, giving a temple shape (width=2.5 mm, thickness=1.2 mm, length=70 mm).

Next, the Ti—Nb—Zr alloy with this temple shape was heated at 800° C. (that is, by raising temperature) to conduct a solution treatment.

Then, a temple-shaped body (a structural member for an eyeglass) was obtained by cooling.

Using the temple-shaped body obtained, a test of shape memory property and super elastic property, and a test of aging character were carried out.

Additionally, aging character is to express whether a shape memory property and a super elastic property exhibited when an aging treatment is conducted is suitable for a structural member for an eyeglass or not, thus, it is strongly affected by the composition of materials.

Test of Shape Memory Property and Super Elastic Property

By applying a force to a temple-shaped body obtained in Examples 1 to 15 and Comparative example 1 to 34, a plastic elongation of 4.0% was given.

Next, by measuring a residual strain upon unloading, a super elastic elongation was calculated by a difference between the plastic elongation and the residual strain.

The super elastic elongation calculated was evaluated as follows: "A" when it was in a range of 3.0% or more, "B" when it was in a range of 2.5% or more, less than 3.0%, "C" when it was in a range of 2.0% or more, less than 2.5%, and "D" when it was in a range of less than 2.0%.

The results obtained are shown in Table 2.

Additionally, when the test result is A, the shape memory property and super elastic property are excellent, and when the test result is B, the shape memory property and super elastic property are relatively good, which can be adopted as the structural member for an eyeglass of the present invention.

Test of Aging Character

A temple-shaped body obtained in Examples 1 to 15 and Comparative example 1 to 34 was subjected to a solution treatment at 800° C. and then coated.

Next, the coated temple-shaped body was subjected to an aging treatment at 200° C., a force was applied to the resulting temple-shaped body to give a plastic elongation of 4.0%.

Next, by measuring a residual strain upon unloading, a super elastic elongation was calculated by a difference between the plastic elongation and the residual strain.

The super elastic elongation calculated was evaluated as follows: "A" when it was in a range of 3.0% or more, "B" when it was in a range of 2.5% or more, less than 3.0%, "C" when it was in a range of 2.0% or more, less than 2.5%, and "D" when it was in a range of less than 2.0%.

The results obtained are shown in Table 2.

Additionally, when the test result is A, the aging character is excellent, and when the test result is B, the aging character is relatively good, which can be adopted as the structural member for an eyeglass of the present invention.

TABLE 1

| | Nb content rate (%) | Zr content rate (%) |
|---|---|---|
| Example 1 | 18 | 10 |
| Example 2 | 18 | 15 |
| Example 3 | 18 | 20 |
| Example 4 | 18 | 25 |
| Example 5 | 18 | 30 |
| Example 6 | 25 | 10 |
| Example 7 | 25 | 15 |
| Example 8 | 25 | 20 |
| Example 9 | 25 | 25 |
| Example 10 | 25 | 30 |
| Example 11 | 30 | 10 |
| Example 12 | 30 | 15 |
| Example 13 | 30 | 20 |
| Example 14 | 30 | 25 |
| Example 15 | 30 | 30 |
| Comparative example 1 | 5 | 5 |
| Comparative example 2 | 5 | 10 |
| Comparative example 3 | 5 | 15 |
| Comparative example 4 | 5 | 20 |
| Comparative example 5 | 5 | 25 |
| Comparative example 6 | 5 | 30 |
| Comparative example 7 | 5 | 35 |
| Comparative example 8 | 10 | 5 |
| Comparative example 9 | 10 | 10 |
| Comparative example 10 | 10 | 15 |
| Comparative example 11 | 10 | 20 |
| Comparative example 12 | 10 | 25 |
| Comparative example 13 | 10 | 30 |
| Comparative example 14 | 10 | 35 |
| Comparative example 15 | 15 | 5 |
| Comparative example 16 | 15 | 10 |
| Comparative example 17 | 15 | 15 |
| Comparative example 18 | 15 | 20 |
| Comparative example 19 | 15 | 25 |
| Comparative example 20 | 15 | 30 |
| Comparative example 21 | 15 | 35 |
| Comparative example 22 | 18 | 5 |
| Comparative example 23 | 18 | 35 |
| Comparative example 24 | 25 | 5 |
| Comparative example 25 | 25 | 35 |
| Comparative example 26 | 30 | 5 |
| Comparative example 27 | 30 | 35 |
| Comparative example 28 | 35 | 5 |
| Comparative example 29 | 35 | 10 |
| Comparative example 30 | 35 | 15 |
| Comparative example 31 | 35 | 20 |
| Comparative example 32 | 35 | 25 |
| Comparative example 33 | 35 | 30 |
| Comparative example 34 | 35 | 35 |

TABLE 2

| | Shape memory property Super elastic property | Aging character |
|---|---|---|
| Example 1 | A | B |
| Example 2 | A | B |
| Example 3 | A | B |
| Example 4 | A | B |
| Example 5 | B | B |
| Example 6 | A | A |
| Example 7 | A | A |
| Example 8 | A | A |
| Example 9 | A | A |
| Example 10 | B | B |
| Example 11 | A | B |
| Example 12 | A | B |
| Example 13 | A | B |
| Example 14 | A | B |
| Example 15 | B | B |
| Comparative example 1 | C | D |
| Comparative example 2 | C | D |
| Comparative example 3 | C | D |
| Comparative example 4 | C | D |
| Comparative example 5 | C | D |
| Comparative example 6 | C | D |
| Comparative example 7 | C | D |
| Comparative example 8 | C | D |
| Comparative example 9 | B | D |
| Comparative example 10 | B | D |
| Comparative example 11 | B | D |
| Comparative example 12 | B | D |
| Comparative example 13 | B | D |
| Comparative example 14 | C | D |
| Comparative example 15 | B | C |
| Comparative example 16 | B | C |
| Comparative example 17 | B | C |
| Comparative example 18 | B | C |
| Comparative example 19 | B | C |
| Comparative example 20 | B | C |
| Comparative | B | C |

TABLE 2-continued

| | Shape memory property Super elastic property | Aging character |
|---|---|---|
| example 21 | | |
| Comparative example 22 | B | C |
| Comparative example 23 | C | D |
| Comparative example 24 | A | C |
| Comparative example 25 | C | C |
| Comparative example 26 | A | C |
| Comparative example 27 | C | C |
| Comparative example 28 | B | C |
| Comparative example 29 | B | C |
| Comparative example 30 | B | C |
| Comparative example 31 | B | C |
| Comparative example 32 | B | C |
| Comparative example 33 | B | C |
| Comparative example 34 | C | D |

As is shown in Table 2, when Nb contained in the temple-shaped body of Examples 1 to 15 was 18 to 30% by weight and Zr was 10 to 30% by weight, the test results of B or higher were obtained in both the test of shape memory property and super elastic property, and the test of aging character.

Namely, it has been known that when the content rate of respective components (A to D) is in the above-described range for a Ti—Nb—Zr alloy, the Ti—Nb—Zr alloy provides a sufficient shape memory property and super elastic property as a structural member for an eyeglass and also provides a sufficient decorative property as a structural member for an eyeglass.

Examples 16 to 30 and Comparative Examples 35, 36

A temple-shaped body (a structural member for an eyeglass) was obtained in the same manner as in Example 1 except that in place of the Ti—Nb—Zr alloy used in Example 1, a Ti—Nb—Zr alloy of Zr: 22% by weight, Nb: 23% by weight, Al of the content shown in the following Table 3, and Ti was set to a value that the contents rate of Nb, Zr and Al were subtracted from 100 was used.

Elastic Deformation Elongation

By applying a force to the temple-shaped body obtained, a plastic elongation of 4.0% was given.

Next, a residual strain was measured on unloading to calculate a plastic elongation and a residual strain.

Then, an elastic deformation elongation (%) shown in the following formula was calculated from the values of the plastic elongation and the residual strain:

The results obtained are shown in Table 3.

Super elastic deformation elongation (%)=Plastic elongation (%)−Residual strain (%)

TABLE 3

| | Al (% by weight) | Super elastic deformation elongation (%) |
|---|---|---|
| Example 16 | 0.3 | 2.8 |
| Example 17 | 0.8 | 3.6 |
| Example 18 | 1.3 | 4.0 |
| Example 19 | 1.5 | 3.8 |
| Example 20 | 1.7 | 3.8 |
| Example 21 | 1.9 | 3.7 |
| Example 22 | 2.1 | 3.6 |
| Example 23 | 2.3 | 3.6 |
| Example 24 | 2.5 | 3.0 |
| Example 25 | 2.7 | 2.8 |
| Example 26 | 2.9 | 2.8 |
| Example 27 | 3.1 | 2.7 |
| Example 28 | 3.3 | 2.7 |
| Example 29 | 3.5 | 2.6 |
| Example 30 | 3.7 | 2.5 |
| Comparative example 35 | 0.1 | 1.9 |
| Comparative example 36 | 3.9 | 1.3 |

As is shown in Table 3, the temple-shaped body of Examples 16 to 30 had a super elastic deformation elongation of 2.0 or more.

Additionally, such a super elastic deformation elongation is preferably 2.5% or more.

Further, when the content rate of Al is 1.3% by weight, the super elastic deformation elongation showed a maximum of 4%, and the range of content rate of Al where the super elastic deformation elongation showed a super elastic deformation elongation of 2.5% or more was 0.3 to 3.7% by weight.

Examples 31 to 34

A temple-shaped body (a structural member for an eyeglass) was obtained in the same manner as in Example 1 except that in place of the Ti—Nb—Zr alloy used in Example 1, a Ti—Nb—Zr alloy of Zr: 22% by weight, Nb: 23% by weight, the additive metal element of the content rate shown in the following Table 4, and Ti set to a value that the content rates of Nb, Zr and the additive metal element were subtracted from 100 was used.

Using the temple-shaped body obtained, the above-mentioned test of shape memory property and super elastic property was carried out. The results obtained are shown in Table 4.

TABLE 4

| | Additive metal element | Content (% by weight) | Shape memory property Super elastic property |
|---|---|---|---|
| Example 31 | Al | 1.3 | A |
| Example 32 | Sn | 3.0 | A |
| Example 33 | In | 3.5 | A |
| Example 34 | Ga | 1.3 | A |

As is shown in Table 4, the temple-shaped body of Examples 31 to 34 each had an excellent shape memory property and super elastic property.

From this fact, it has been confirmed that Al, Sn, In and Ga can be used as an additive metal element.

Example 35

A temple-shaped body (a structural member for an eyeglass) was obtained in the same manner as in Example 1 except that in place of the Ti—Nb—Zr alloy used in Example 1, a Ti—Nb—Zr alloy of Ti: 53.4% by weight, Nb: 23% by weight, Zr: 22% by weight and Al: 1.60 by weight was used.

Using the temple-shaped body obtained, a tensile test was carried out.

Example 36

A temple-shaped body (a structural member for an eyeglass) was obtained in the same manner as in Example 1 except that in place of the Ti—Nb—Zr alloy used in Example 1, a Ti—Nb—Zr alloy of Ti: 53.1% by weight, Nb: 23% by weight, Zr: 22% by weight, and Al: 1.9% by weight was used.

Using the temple-shaped body obtained, a tensile test was carried out.

Example 37

A temple-shaped body (a structural member for an eyeglass) was obtained in the same manner as in Example 1 except that in place of the Ti—Nb—Zr alloy used in Example 1, a Ti—Nb—Zr alloy of Ti: 52.7% by weight, Nb: 23% by weight, Zr: 22% by weight, and Al: 2.3% by weight was used.

Using the temple-shaped body obtained, a tensile test was carried out.

Tensile Test

The temple-shaped body obtained in Examples 35 to 37 was placed on a tensile tester, which was slowly loaded to elongate for a super elastic deformation elongation to be 4%.

From this state, the temple-shaped body was returned to the original shape by slowly unloading.

Then, the difference of a ratio of the original length of the temple-shaped body to the length of the temple-shaped body when returned to the original shape (a super elastic deformation elongation) was measured.

Stress-elongation curves of the temple-shaped bodies of Examples 35 to 37 at this time are shown in FIGS. 1 to 3, respectively.

As shown in FIGS. 1 to 3, in the case of the temple-shaped body of Example 35 (Al: 1.6% by weight), a residual strain of about 0.2% occurred, as a result, it showed a super elastic deformation elongation of 3.8%.

In the case of the temple-shaped body of Example 36 (Al: 1.9% by weight), a residual strain of about 0.3% occurred, as a result, it showed a super elastic elongation of 3.7%.

In the case of the temple-shaped body of Example 37 (Al: 2.3% by weight), a residual strain of about 0.4% occurred, as a result, it showed a super elastic elongation of 3.6% as shown in FIG. 3.

From these, it was known that a super elastic elongation was changed by changing the added amount of Al.

Additionally, all of the present Examples have the tensile test done under normal temperature, which is not a test in the region of martensitic transformation-reverse martensitic transformation that occurs in a range from −50° C. to −30° C., thus, only the super elastic property is shown.

Apparently, if a test is done in the region of martensitic transformation-reverse martensitic transformation, a shape memory property will be shown.

Example 38

A temple-shaped body (a structural member for an eyeglass) was obtained in the same manner as in Example 1 except that in place of the Ti—Nb—Zr alloy used in Example 1, a Ti—Nb—Zr alloy of Ti: 53.7% by weight, Nb: 23% by weight, Zr: 22% by weight, and Al: 1.3% by weight was used, and the thickness of a temple-shaped body was set to 1.0 mm instead of 1.2 mm.

Using the temple-shaped body obtained, the above-mentioned tensile test was carried out.

A stress-elongation curve of the temple-shaped body of Examples 38 at this time is shown in FIG. 4.

As shown in FIG. 4, when a stress of 580 MPa was applied to the above-described temple-shaped body, it showed a plastic elongation of 4%, when unloaded, a residual strain of about 0.6% occurred, and a super elastic elongation of 3.4% (=4%-0.6%) was shown.

Example 39

Using the Ti—Nb—Zr alloy used in Example 38, the above-mentioned tensile test was carried out twice in succession by holding a test piece set in a testing machine.

A stress-elongation curve of the temple-shaped body of Examples 39 at this time is shown in FIG. 5.

As shown in FIG. 5, when a stress of about 620 MPa was applied to the above-described temple-shaped body at a first time [(a) in FIG. 5], it showed a plastic elongation of 4%, when unloaded, a residual strain of 1.5% occurred.

In this state, when a stress of about 650 MPa was applied again to the temple-shaped body [(b) in FIG. 5], this temple-shaped body showed a plastic elongation of 5.2%, when unloaded, a residual strain of 1.6% occurred from the point where the load of the first time was zero.

From this fact, it was confirmed that a super elastic property and a shape memory property were exhibited in this temple-shaped body.

Example 40

A temple-shaped body (a structural member for an eyeglass) was obtained in the same manner as in Example 1 except that in place of the Ti—Nb—Zr alloy used in Example 1, a Ti—Nb—Zr alloy of Ti: 52.0% by weight, Nb: 23% by weight, Zr: 22% by weight, and Sn: 3.0% by weight was used, and the thickness of a temple-shaped body was set to 1.0 mm instead of 1.2 mm.

Using the temple-shaped body obtained, the above-mentioned tensile test was carried out.

A stress-elongation curve of the temple-shaped body of Examples 40 at this time is shown in FIG. 6.

As shown in FIG. 6, when a stress of 770 MPa was applied to the above-described temple-shaped body at a first time, (a) in FIG. 6, it showed a plastic elongation of 4%, when unloaded, a residual strain of 1.0% occurred.

In this state with a residual strain of 1.0%, when a stress of about 800 MPa was applied again to this temple-shaped body, (b) in FIG. 6, it showed a plastic elongation of 5.0%, when unloaded, a residual strain of 1.8% occurred from the point where the elongation was zero.

From this fact, it was confirmed that a super elastic property and a shape memory property were exhibited in this temple-shaped body.

Example 41

A temple-shaped body (a structural member for an eyeglass) was obtained in the same manner as in Example 1 except that in place of the Ti—Nb—Zr alloy used in Example 1, a Ti—Nb—Zr alloy of Ti: 51.5% by weight, Nb: 23% by weight, Zr: 22% by weight, and In: 3.5% by weight was used, and the thickness of a temple-shaped body was set to 1.0 mm instead of 1.2 mm.

Using the temple-shaped body obtained, the above-mentioned tensile test was carried out.

A stress-elongation curve of the temple-shaped body of Examples 41 at this time is shown in FIG. 7.

As shown in FIG. 7, when a stress of 620 MPa was applied to the above-described temple-shaped body, it showed a plastic elongation of 4%, when unloaded, a residual strain of about 0.4% occurred, and a super elastic elongation of 3.6% (=4%-0.4%) was shown.

Further, not shown in the figure, when a stress of 750 MPa was applied to the temple-shaped body, this temple-shaped body showed a plastic elongation of 4%, when unloaded, a residual strain of 0.9% occurred, and a super elastic elongation of 3.1% (=4%-0.9%) was shown.

From this fact, it was confirmed that a super elastic property and a shape memory property were exhibited in this temple-shaped body.

Example 42

A temple-shaped body (a structural member for an eyeglass) was obtained in the same manner as in Example 1 except that in place of the Ti—Nb—Zr alloy used in Example 1, a Ti—Nb—Zr alloy of Ti: 53.7% by weight, Nb: 23% by weight, Zr: 22% by weight, and Ga: 1.3% by weight was used, and the thickness of a temple-shaped body was set to 1.0 mm instead of 1.2 mm.

Using the temple-shaped body obtained, the above-mentioned tensile test was carried out.

A stress-elongation curve of the temple-shaped body of Examples 42 at this time is shown in FIG. 8.

As shown in FIG. 8, when a stress of 820 MPa was applied to the above-described temple-shaped body, it showed a plastic elongation of 4%, when unloaded, a residual strain of 0.8% occurred, and a super elastic elongation of 3.2% (=4%-0.8%) was shown.

Further, not shown in the figure, when a stress of 750 MPa was applied to the temple-shaped body, this temple-shaped body showed a plastic elongation of 4%.

From this fact, it was confirmed that a super elastic property and a shape memory property were exhibited in this temple-shaped body.

Additionally, the temple-shaped bodies of the above-described Examples 35 to 42 each were subjected to a cold working (rolling working) of a surface reduction ratio (namely, cross-section reduction ratio) exceeding 50%, but no temple-shaped body was broken at this time.

Further, if multiple rolling workings are conducted for a temple-shaped body, it has been known that a cold working of a surface reduction ratio of 95% or more is possible without annealing.

Example 43

Superiority of Aging Treatment

A temple-shaped body (a structural member for an eyeglass) was obtained in the same manner as in Example 1 except that in place of the Ti—Nb—Zr alloy used in Example 1, a Ti—Nb—Zr alloy of Ti: 54.9% by weight, Nb: 22% by weight, Zr: 22% by weight, and Al: 1.1% by weight was used.

Using the temple-shaped body obtained, the above-mentioned tensile test was carried out.

A stress-elongation curve of the temple-shaped body at this time is shown in FIG. 9.

After the tensile test, the above-described temple-shaped body was heated at 200° C. to conduct an aging treatment.

Then, a tensile test was carried out again.

A stress-elongation curve of the temple-shaped body at this time is shown in FIG. 10.

As shown in FIGS. 9 and 10, it has been known that the above-described temple-shaped body has a higher apparent yield stress of a super elastic property by the aging treatment.

Example 44

Heating for Baking

A temple-shaped body (a structural member for an eyeglass) was obtained in the same manner as in Example 1 except that in place of the Ti—Nb—Zr alloy used in Example 1, a Ti—Nb—Zr alloy of Ti: 54.9% by weight, Nb: 22% by weight, Zr: 22% by weight, and Al: 1.1% by weight was used.

Next, the temple-shaped body obtained was heated at 200° C. to conduct an aging treatment, thereafter, coating was conducted.

Using the temple-shaped body thus obtained, the above-mentioned tensile test was carried out.

A stress-elongation curve of the temple-shaped body of Examples 44 at this time is shown in FIG. 11.

As shown in FIG. 11, it has been known that the above-described temple-shaped body has a higher apparent yield stress of a super elastic property.

Example 45

Simultaneously Achieving Effect of Baking

A temple-shaped body (a structural member for an eyeglass) was obtained in the same manner as in Example 1 except that in place of the Ti—Nb—Zr alloy used in Example 1, a Ti—Nb—Zr alloy of Ti: 54.9% by weight, Nb: 22% by weight, Zr: 22% by weight, and Al: 1.1% by weight was used.

Next, the temple-shaped body obtained was coated and, thereafter, heated at 200° C. to conduct an aging treatment.

Using the temple-shaped body thus obtained, the above-mentioned tensile test was carried out.

A stress-elongation curve of the temple-shaped body of Example 45 at this time is shown in FIG. 12.

As shown in FIG. 12, it has been known that the above-described temple-shaped body has a higher apparent yield stress of a super elastic property.

Further, the coating on a surface of the temple-shaped body was surely baked.

Therefore, from the result of Example 45, it has been known that baking of plating or coating is achieved simultaneously by an aging treatment without conducting a heat treatment for baking of coating.

From this fact, it can be said to be efficient in production compared with the case of Example 44.

Example 46

Heating Temperature of Solution Treatment: 500° C.

A temple-shaped body (a structural member for an eyeglass) was obtained in the same manner as in Example 1 except that in place of the Ti—Nb—Zr alloy used in Example 1, a Ti—Nb—Zr alloy of Ti: 53.7% by weight, Nb: 22% by weight, Zr: 23% by weight, and Al: 1.3% by weight was used, the thickness of a temple-shaped body was set to 1.0 mm instead of 1.2 mm, and the temperature of solution treatment was set to 500° C. instead of 800° C.

Using the temple-shaped body obtained, the above-mentioned tensile test was carried out.

A stress-elongation curve of the temple-shaped body of Example 46 at this time is shown in FIG. 13.

As shown in FIG. 13, when a stress of 970 MPa was applied to the above-described temple-shaped body, it showed a plastic elongation of 3%, when unloaded, a residual strain of about 1.5% occurred.

From this fact, it has been confirmed that when the temperature of solution treatment is 500° C., a super elastic property and a shape memory property become insufficient compared with the case of 800° C.

Example 47

Multiple Aging Treatments

A temple-shaped body (a structural member for an eyeglass) was obtained in the same manner as in Example 1 except that in place of the Ti—Nb—Zr alloy used in Example 1, a Ti—Nb—Zr alloy of Ti: 54.9% by weight, Nb: 22% by weight, Zr: 22% by weight, and Al: 1.1% by weight was used.

Next, the temple-shaped body obtained was heated at 200° C. to conduct an aging treatment, and using the temple-shaped body obtained, the above-mentioned tensile test was carried out.

Next, it was heated again at 200° C. to conduct an aging treatment, and using the temple-shaped body obtained, the above-mentioned tensile test was carried out once again.

A stress-elongation curve of the temple-shaped body of Example 47 at this time is shown in FIG. 14.

Additionally, a broken line (a) in FIG. 14 is a stress-elongation curve of the temple-shaped body obtained by the tensile test after a first-time aging treatment, and a solid line (b) is a stress-elongation curve of the temple-shaped body obtained by the tensile test after a second-time aging treatment.

As shown in FIG. 14, it has been known that the above-described temple-shaped body in the case of aging treatments done twice has a higher apparent yield stress compared with the case of an aging treatment done once.

From this fact, it was known that an apparent yield stress of a superelasticity, that is, touch of deformation was changed towards a stiffer direction by the number of aging treatments.

Comparative Example 37

A temple-shaped body (a structural member for an eyeglass) was obtained in the same manner as in Example 1 except that in place of the Ti—Nb—Zr alloy used in Example 1, a Ti—Nb—Zr alloy of Ti: 67.5% by weight, Nb: 25% by weight, Zr: 5% by weight, and Al: 2.5% by weight was used.

Using the temple-shaped body obtained, the above-mentioned tensile test was carried out.

After the tensile test, the above-described temple-shaped body was heated at 200° C. to conduct an aging treatment. Then, a tensile test was carried out again.

A stress-elongation curve of the temple-shaped body of Comparative example 37 at this time is shown in FIG. 15. Additionally, (a) in FIG. 15 is a tress-elongation curve of the temple-shaped body after a solution treatment, and (b) is a stress-elongation curve of the temple-shaped body after an aging treatment.

As shown in FIG. 15, it was known that the above-described temple-shaped body did not provide an excellent super elastic property with or without an aging treatment.

INDUSTRIAL APPLICABILITY

The present invention relates to a structural member for use in an eyeglass using a shape memory and super elastic alloy which has an excellent cold workability and an excellent biocompatibility as well, and an eyeglass frame comprising the structural member, and processes for producing them, it can be applied to various parts as long as it is used as a structural member.

Additionally, the present invention is not necessarily limited to these Examples.

Figure 1:
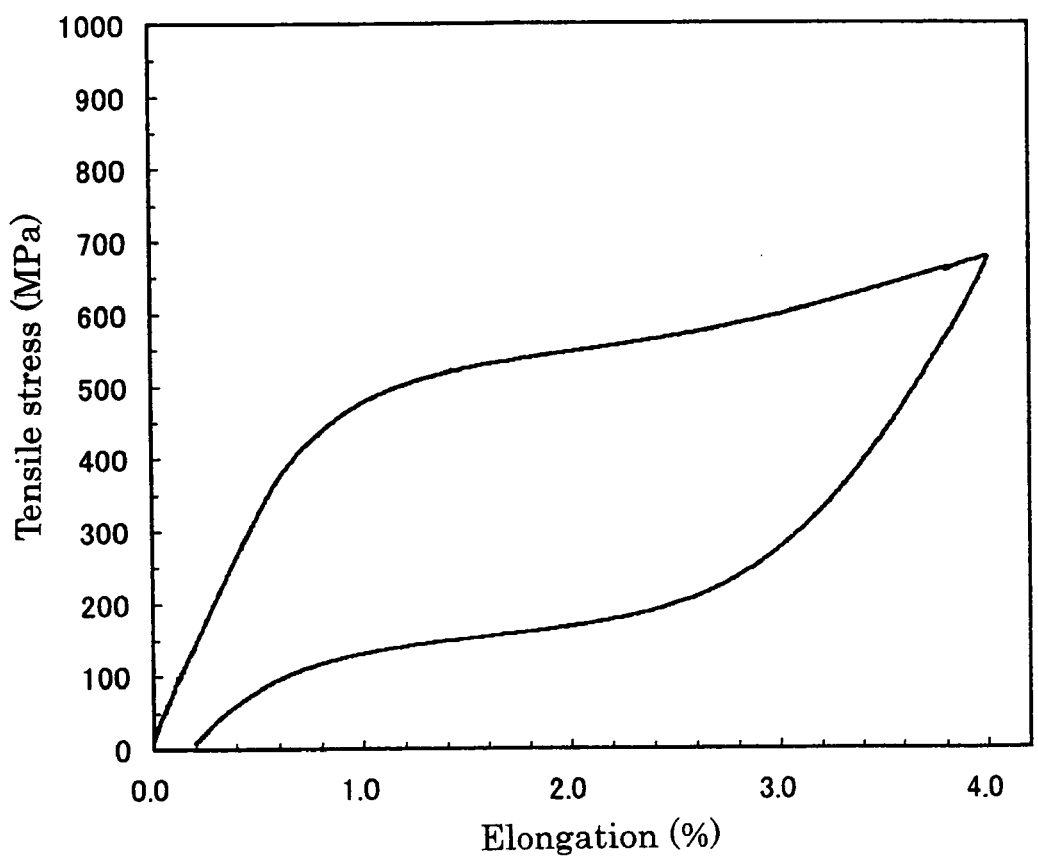
FIG. 1 is a graph showing a stress-elongation curve of the temple-shaped body (structural member for an eyeglass) of Example 35.
Figure 2:
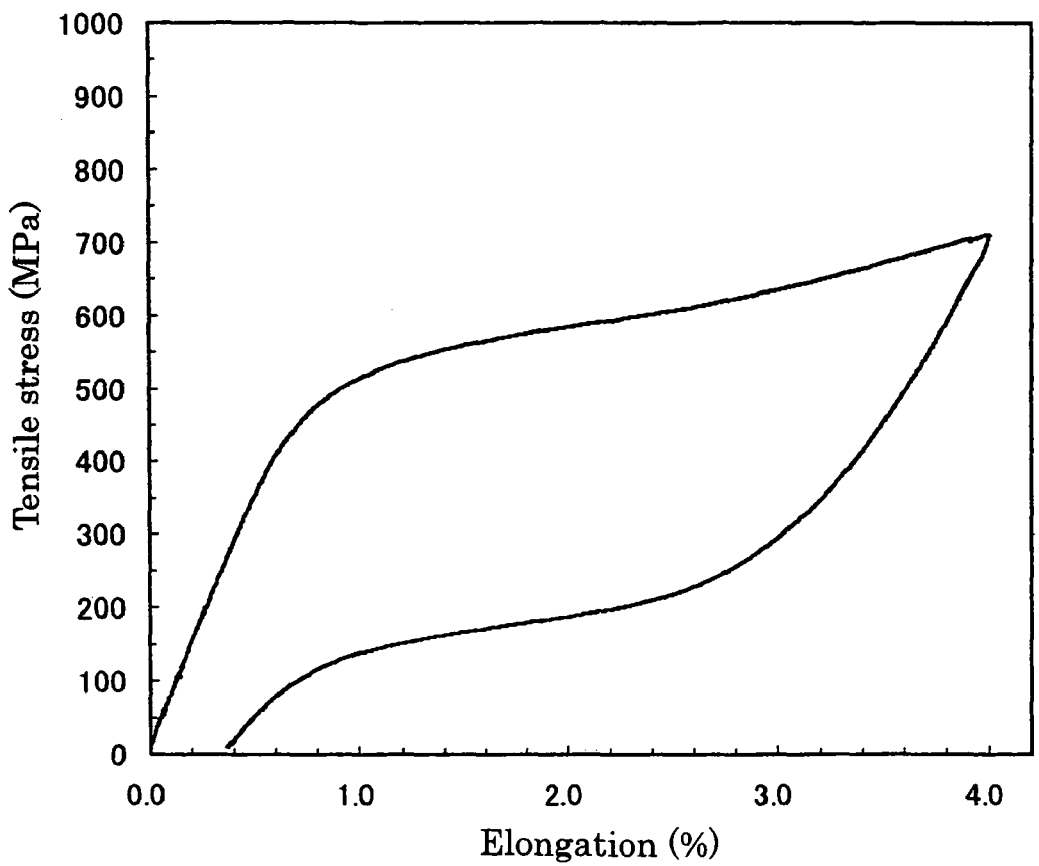
FIG. 2 is a graph showing a stress-elongation curve of the temple-shaped body (structural member for an eyeglass) of Example 36.
Figure 3:
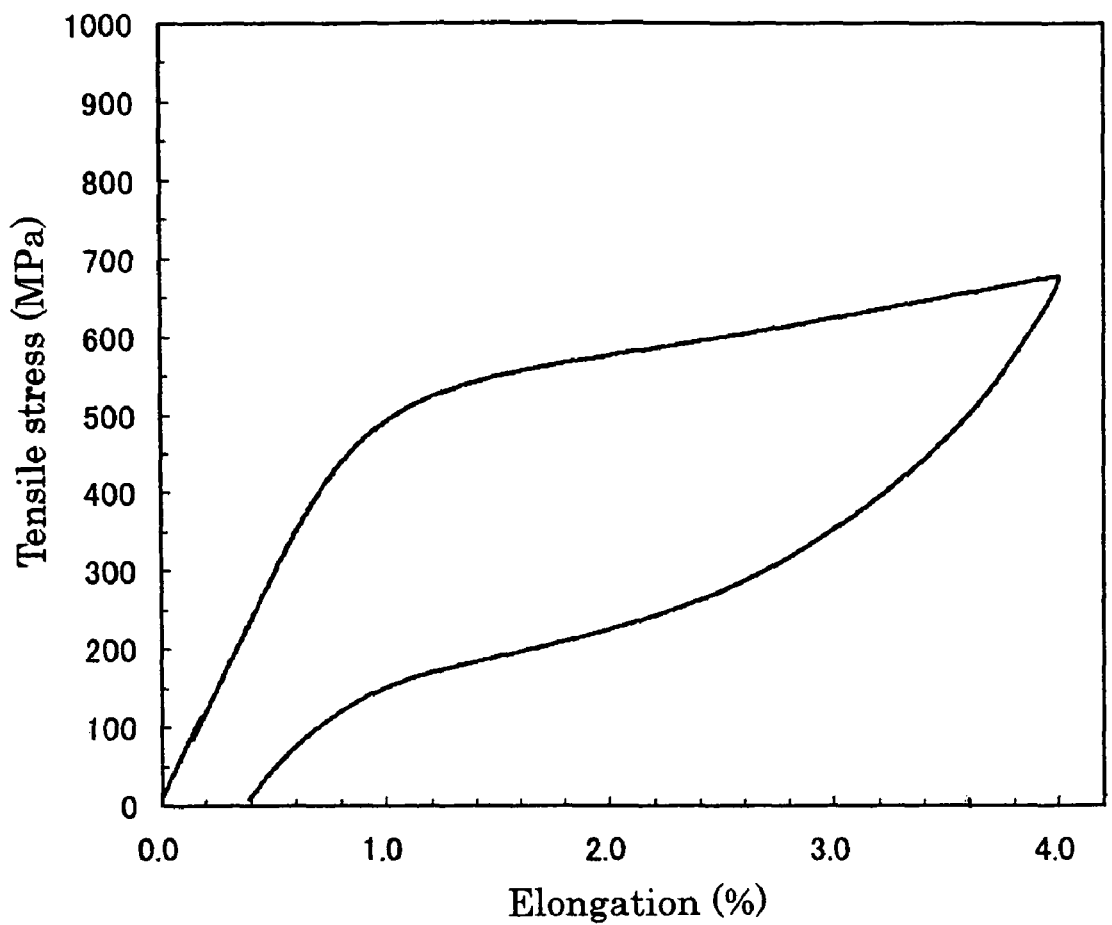
FIG. 3 is a graph showing a stress-elongation curve of the temple-shaped body (structural member for an eyeglass) of Example 37.
Figure 4:
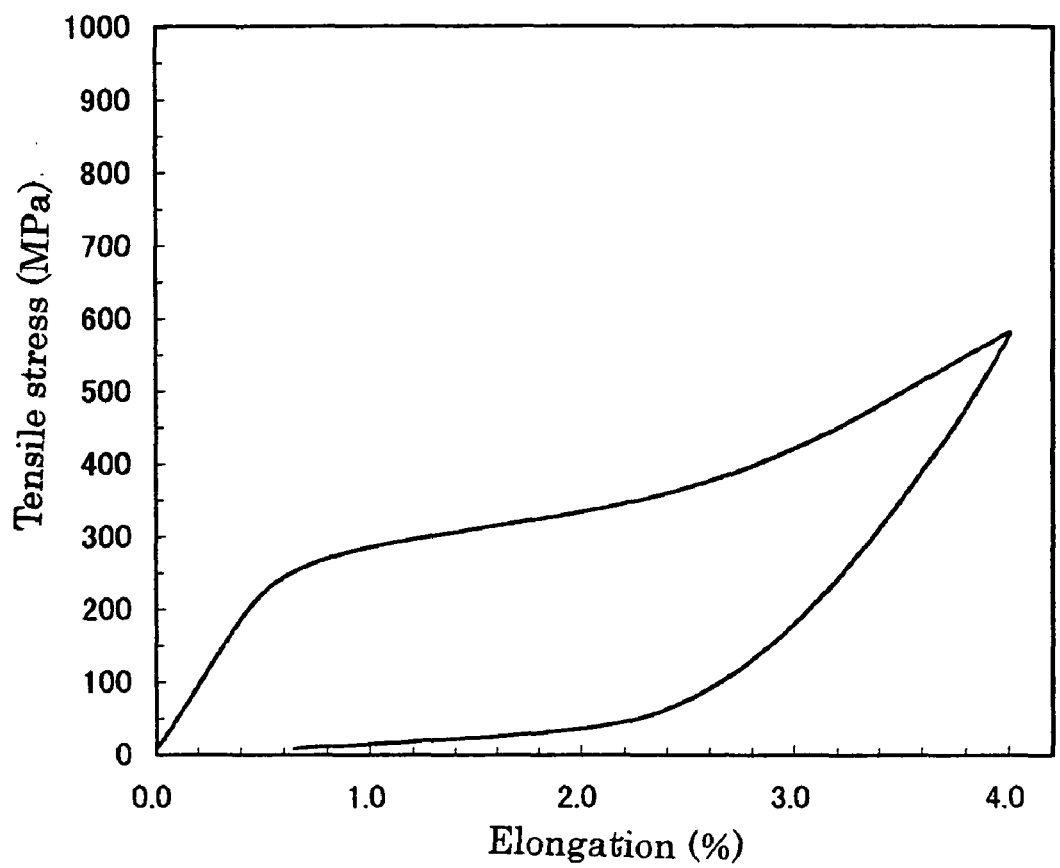
FIG. 4 is a graph showing a stress-elongation curve of the temple-shaped body (structural member for an eyeglass) of Example 38.
Figure 5:
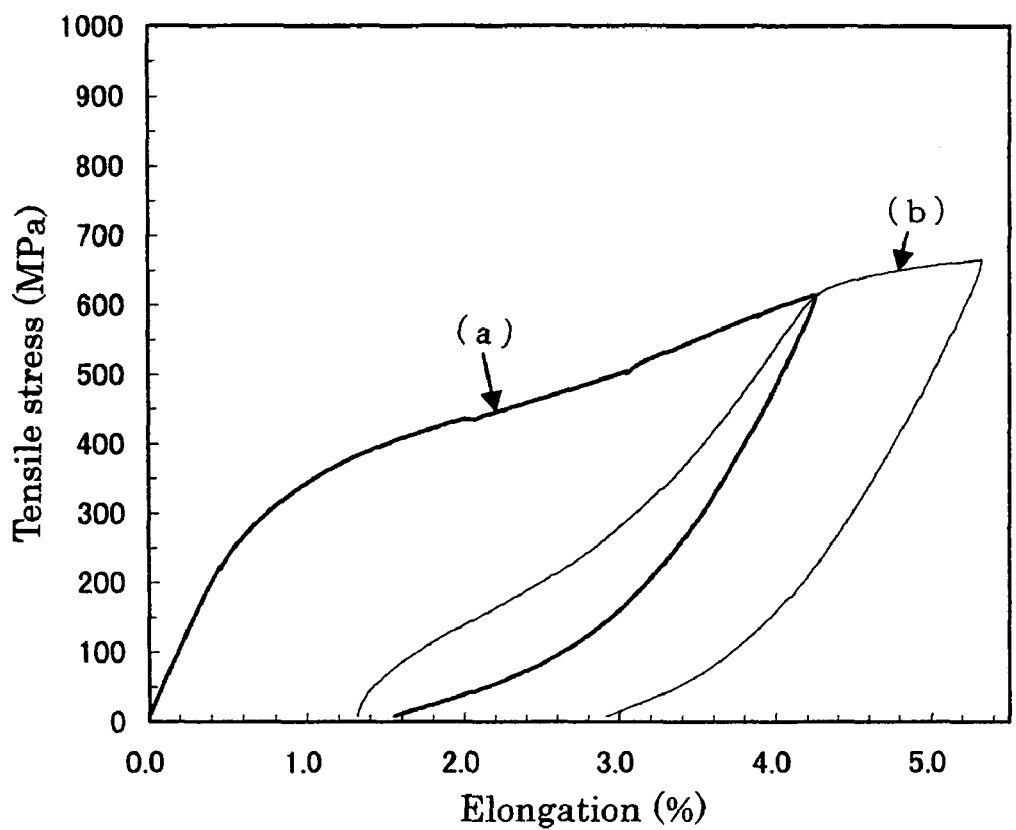
FIG. 5 is a graph showing a stress-elongation curve of the temple-shaped body (structural member for an eyeglass) of Example 39.
Figure 6:
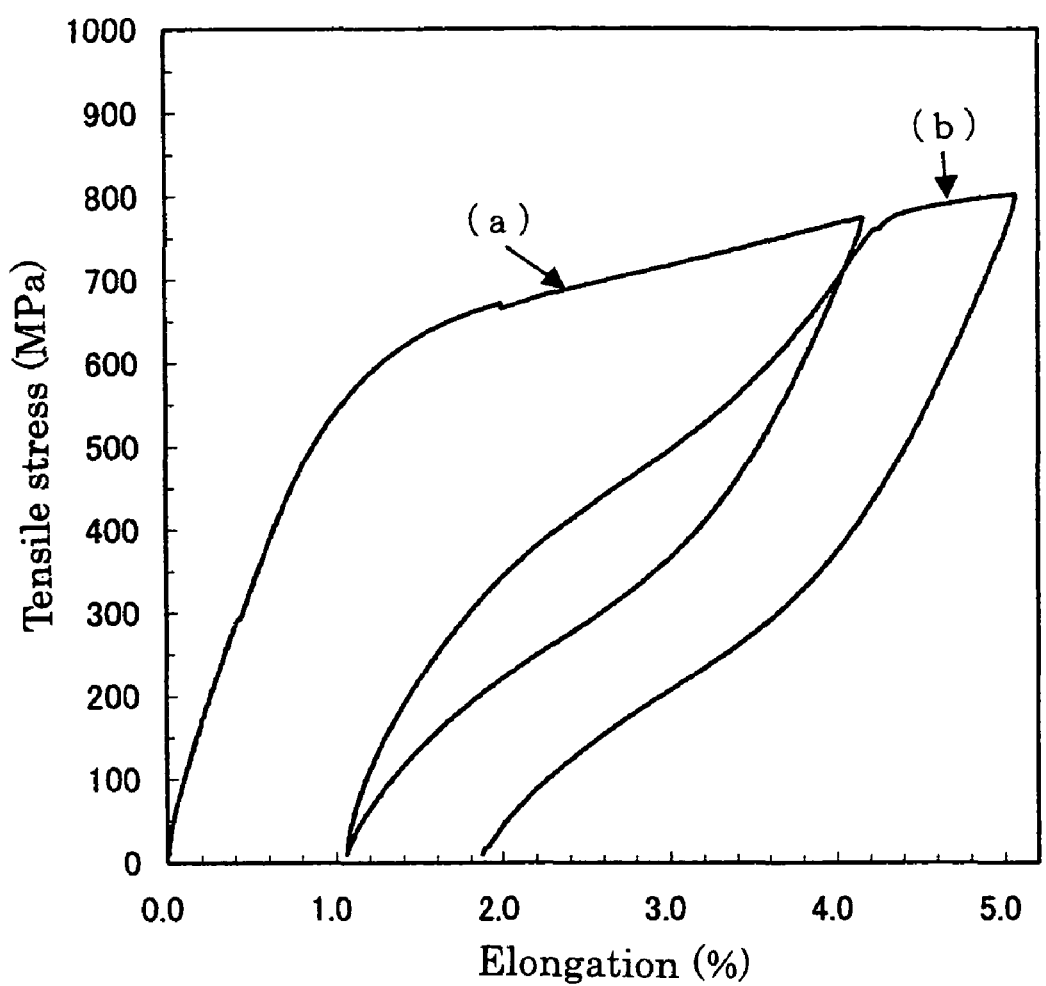
FIG. 6 is a graph showing a stress-elongation curve of the temple-shaped body (structural member for an eyeglass) of Example 40.
Figure 7:
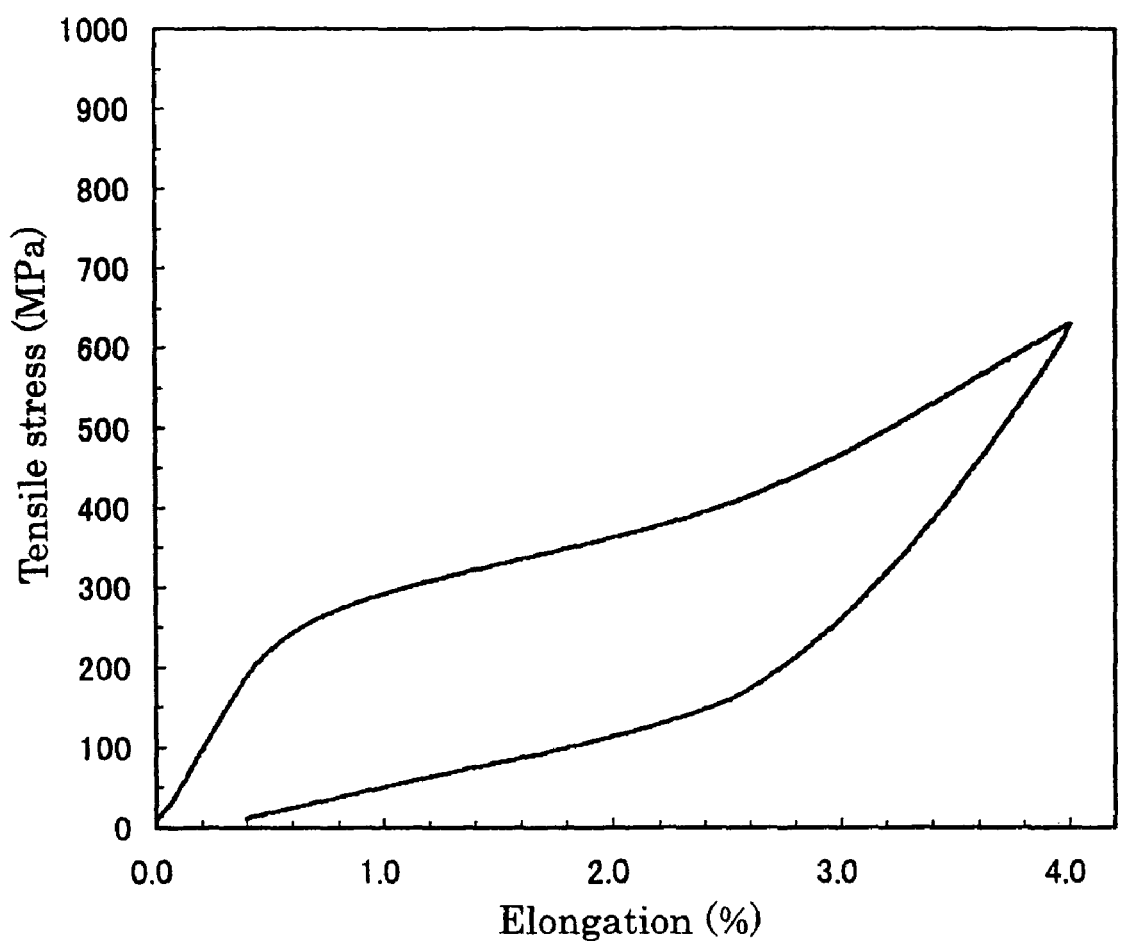
FIG. 7 is a graph showing a stress-elongation curve of the temple-shaped body (structural member for an eyeglass) of Example 41.
Figure 8:
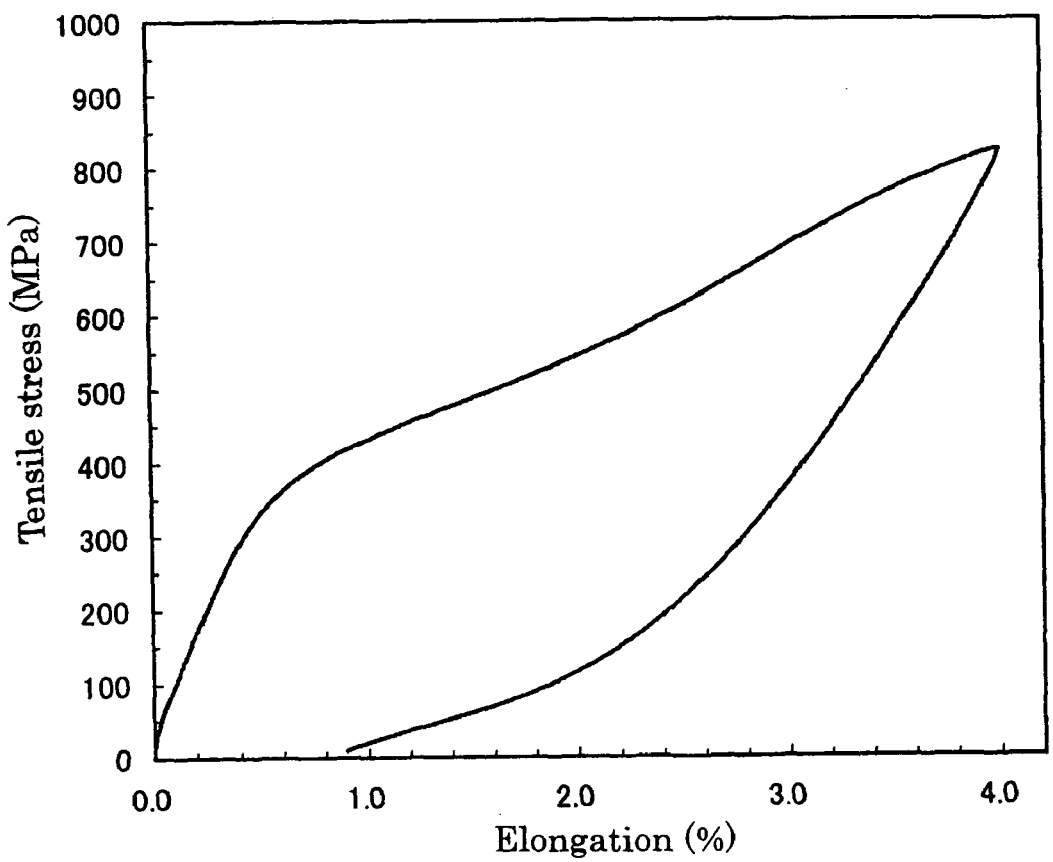
FIG. 8 is a graph showing a stress-elongation curve of the temple-shaped body (structural member for an eyeglass) of Example 42.
Figure 9:
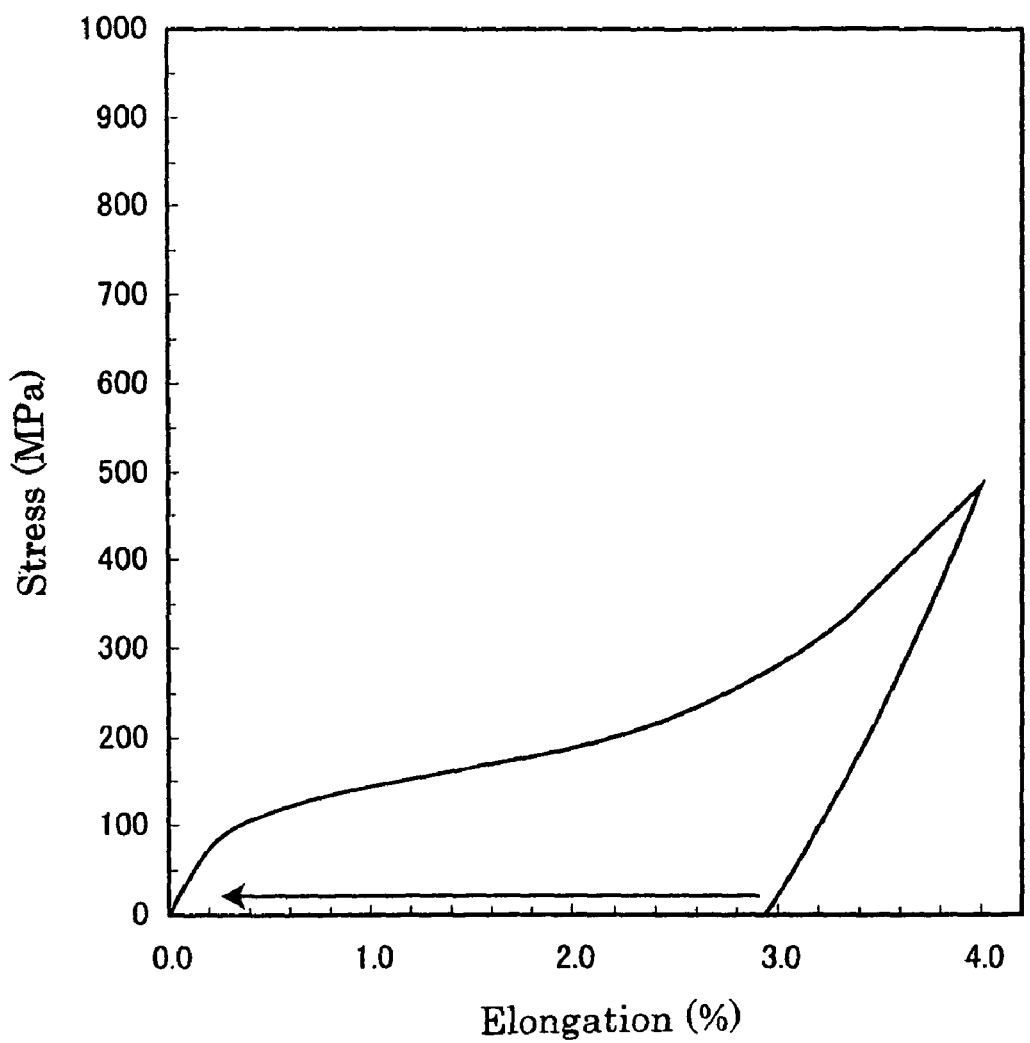
FIG. 9 is a graph showing a stress-elongation curve of the temple-shaped body (structural member for an eyeglass) in the case where no aging treatment was conducted in Example 43.
Figure 10:
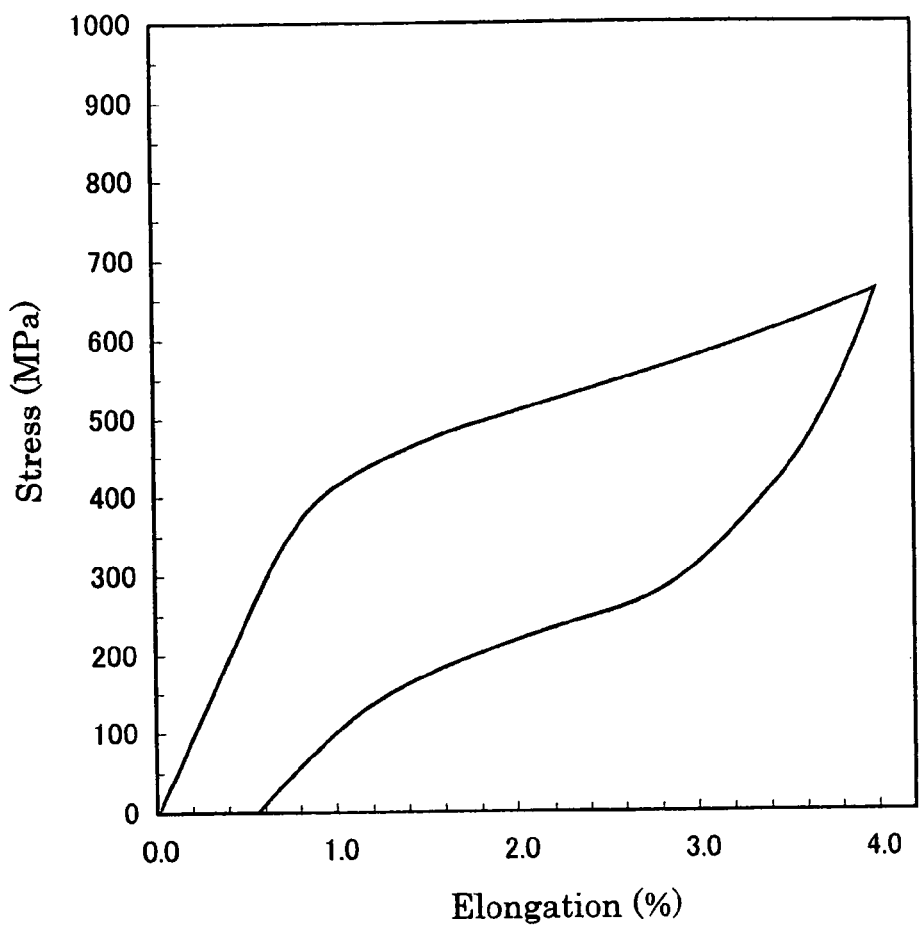
FIG. 10 is a graph showing a stress-elongation curve of the temple-shaped body (structural member for an eyeglass) in the case where an aging treatment was conducted in Example 43.
Figure 11:
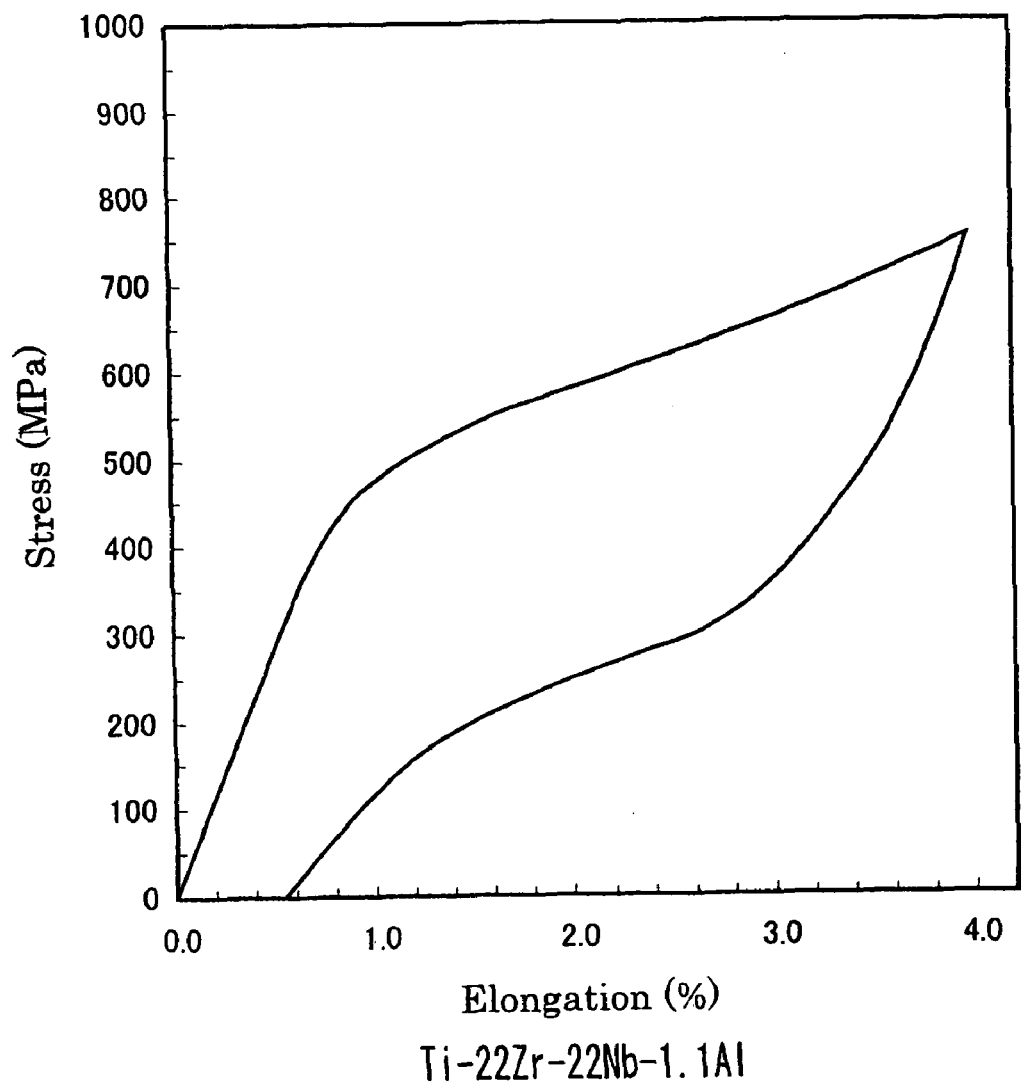
FIG. 11 is a graph showing a stress-elongation curve of the temple-shaped body (structural member for an eyeglass) of Example 44.
Figure 12:
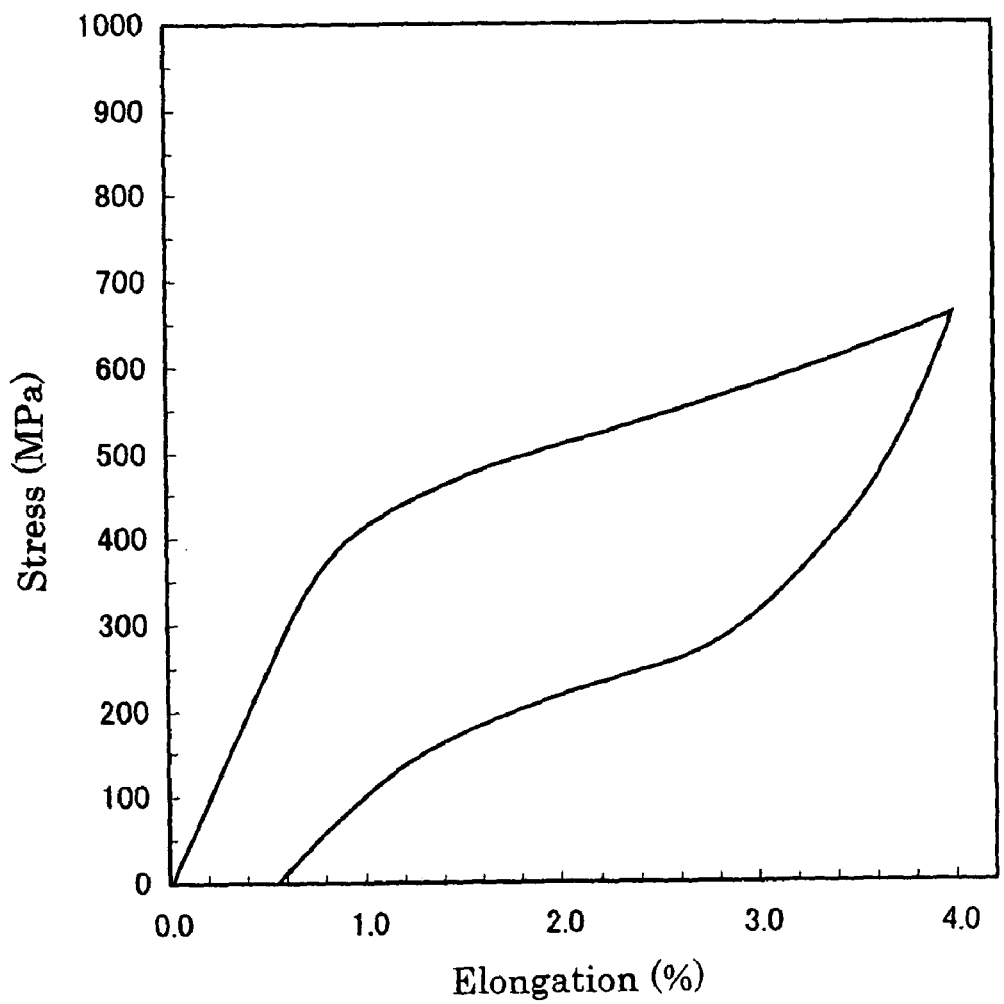
FIG. 12 is a graph showing a stress-elongation curve of the temple-shaped body (structural member for an eyeglass) of Example 45.
Figure 13:
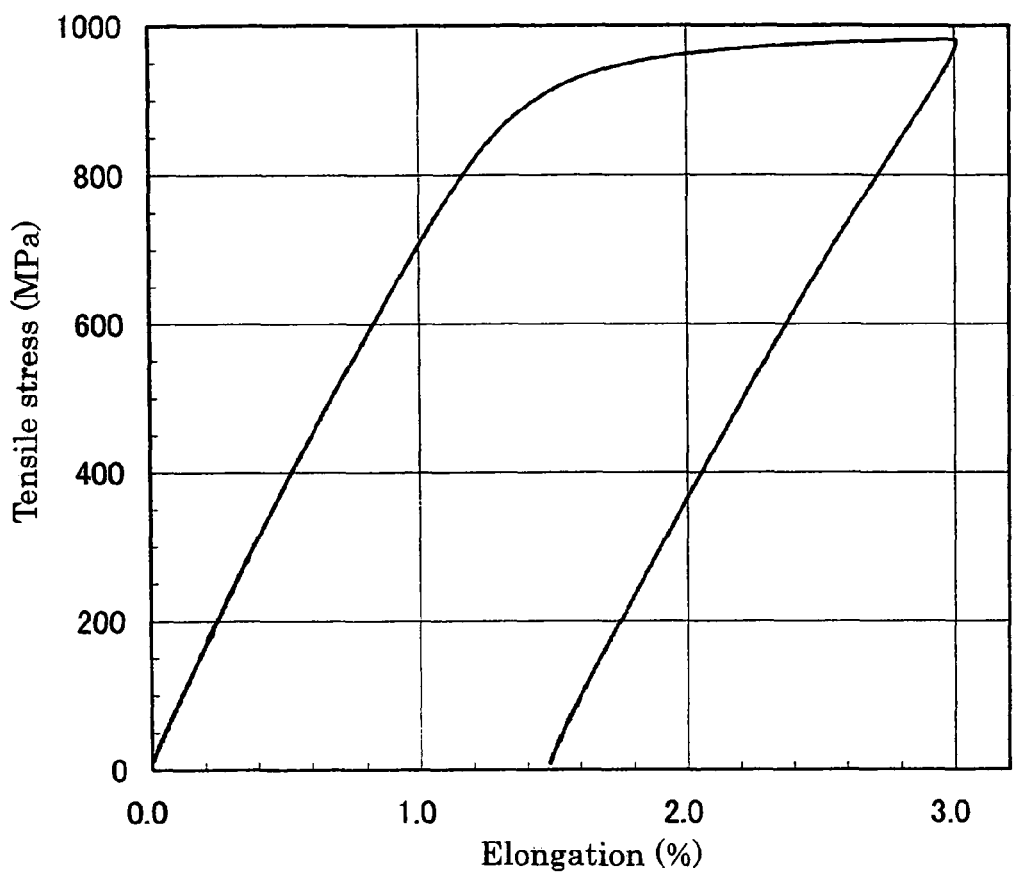
FIG. 13 is a graph showing a stress-elongation curve of the temple-shaped body (structural member for an eyeglass) of Example 46.
Figure 14:
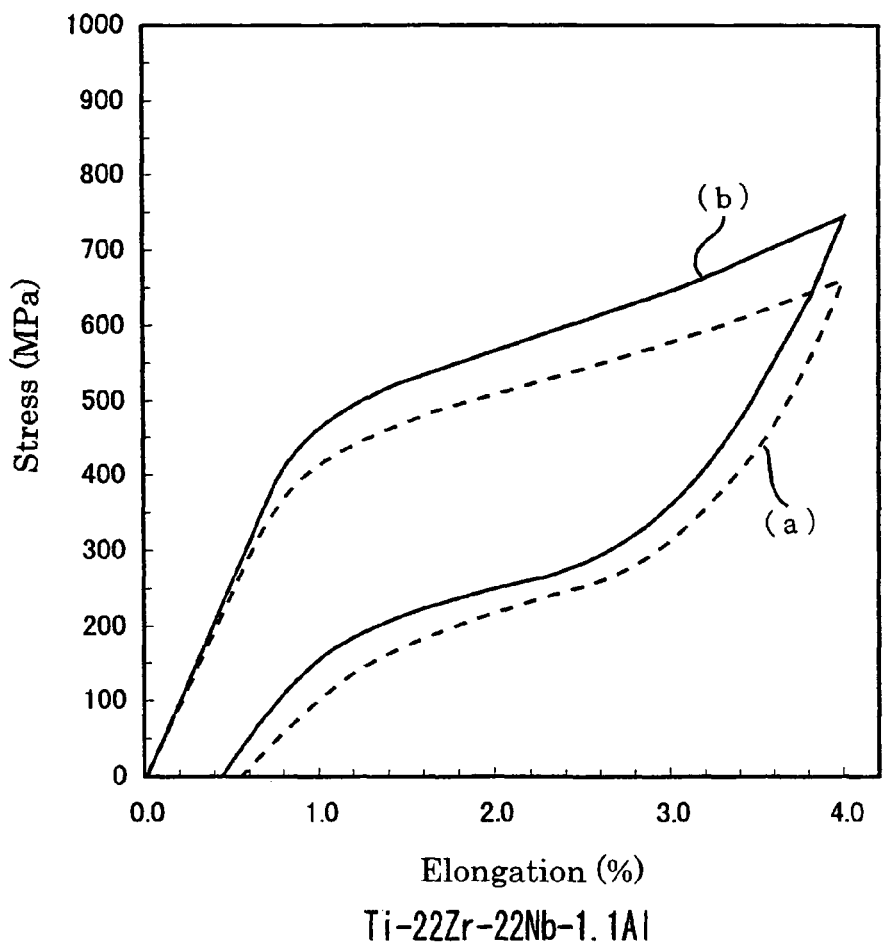
FIG. 14 is a graph showing a stress-elongation curve of the temple-shaped body (structural member for an eyeglass) of Example 47.
Figure 15:
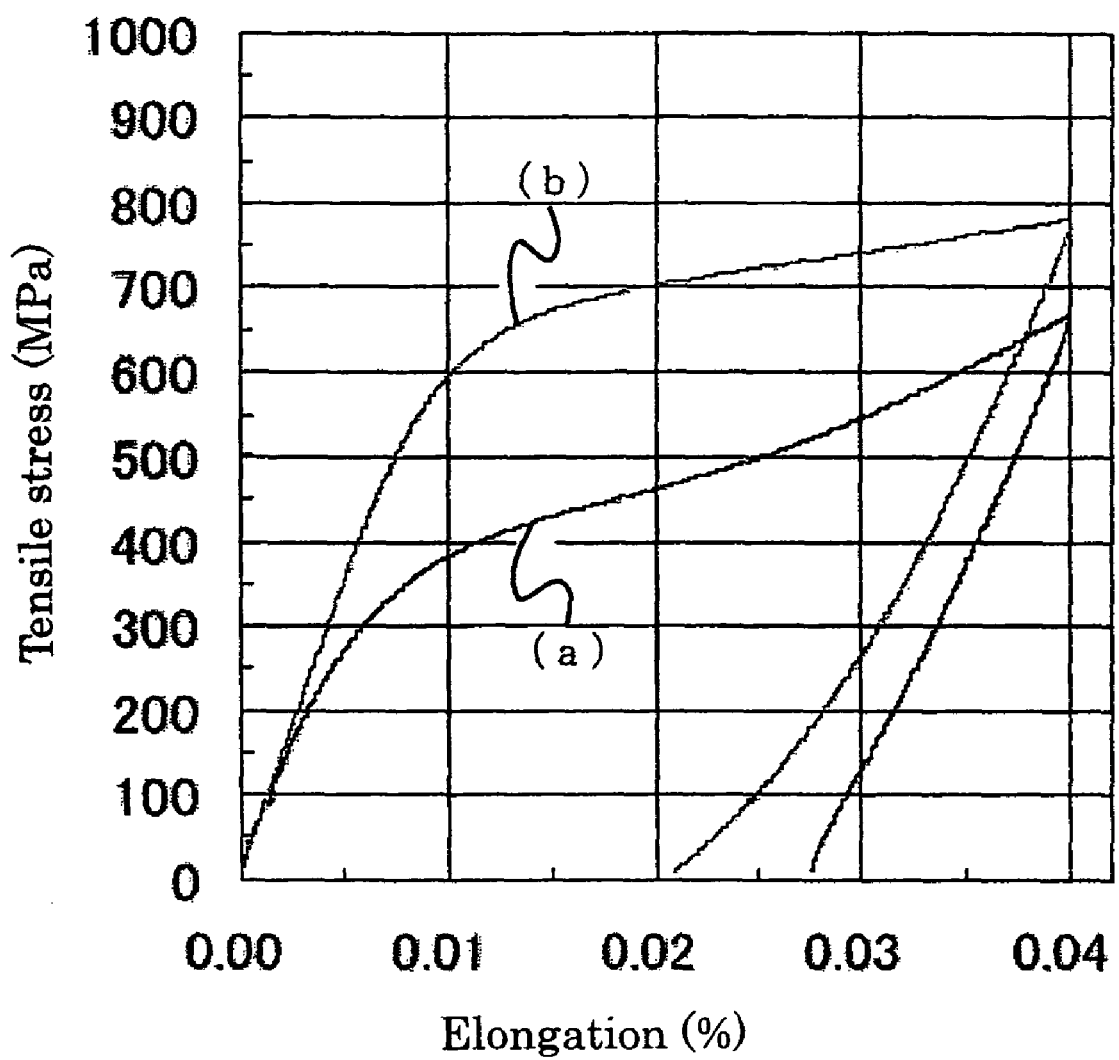
FIG. 15 is a graph showing a stress-elongation curve of the temple-shaped body (structural member for an eyeglass) of Comparative example 37.
Figure 16:
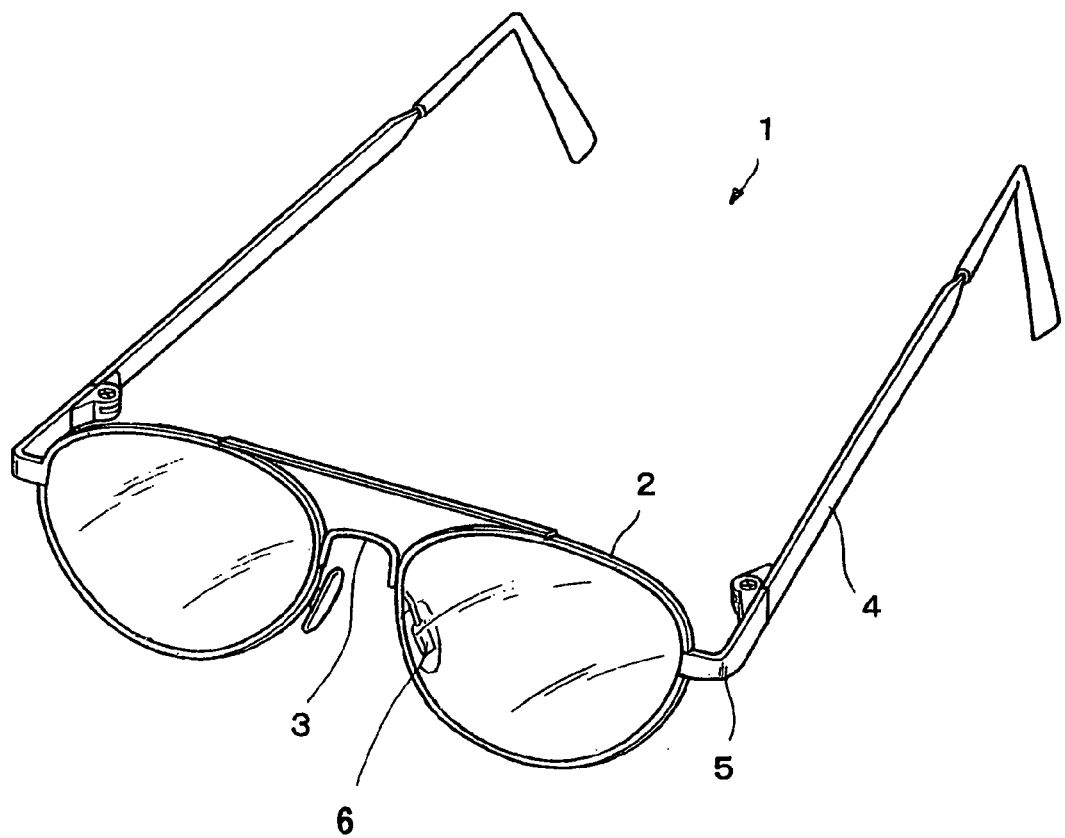
FIG. 16 is a schematic diagram of a structural member for an eyeglass.

| Description of number and symbol | |
|---|---|
| 1 | Structural member for an eyeglass |
| 2 | Rim |
| 3 | Bridge |
| 4 | Temple |
| 5 | Bracket |
| 6 | Nose pad support |

The invention claimed is:

1. A superelastic structural member for an eyeglass comprising a Ti—Nb—Zr alloy composition containing
   (A) Ti: 40-75% by weight,
   (B) Nb: 18-30% by weight,
   (C) Zr: 10-30% by weight, and
   (D) at least one additive metal element selected from the group consisting of Al, Sn, In and Ga in an amount of 0.2-3.7% by weight, wherein said alloy composition is a superelastic alloy which undergoes martensitic transformation—reverse martensitic transformation without the application of heat thereto.

2. The superelastic structural member of claim 1, wherein said structural member is at least one of a rim, a bridge, a bracket, a nose pad support and a temple.

3. A process for the production of a superelastic structural member for an eyeglass, comprising the steps of:
   cold-working a Ti—Nb—Zr alloy composition containing
   (A) Ti: 40-75% by weight,
   (B) Nb: 18-30% by weight,
   (C) Zr: 10-30% by weight, and
   (D) at least one additive metal element selected from the group consisting of Al, Sn, In and Ga in an amount of 0.2-3.7% by weight to obtain a surface reduction ratio of at least 50% and lengthen the alloy composition into a final shape;
   conducting a solution treatment to provide a shape memory and super-elastic properties to the alloy composition in a final shape;
   providing a plating or a coating on a surface of the alloy composition in the final shape; and
   conducting baking of the plating or coating simultaneously with an aging treatment of the alloy composition at a temperature of at least 100° C.;
   wherein said alloy composition forms a superplastic alloy which undergoes martensitic transformation—reverse martensitic transformation without the application of heat thereto.

4. The process for production of a structural member for an eyeglass according to claim 3, wherein the temperature of the solution treatment is 550° C. to 1100° C.

5. A process for production of an eyeglass frame comprising the step of incorporating the superplastic structural member of claim 3.

6. The process for the production of the superplastic structural member of claim 3, wherein the Ti and Zr each have a body-centered cubic crystal structure and superelastic elongation of the structural member is at least 2.5.

7. The process for the production of the superplastic structural member of claim 3, wherein the superplastic structural member is at least one of a rim, a bridge, a bracket, a nose pad support and a temple.

* * * * *